United States Patent
Wolfson et al.

(10) Patent No.: US 11,086,837 B2
(45) Date of Patent: Aug. 10, 2021

(54) FAST KEY-VALUE STORAGE FOR CONTINUOUS DATA PROTECTION SYSTEMS

(71) Applicant: EMC IP Holding Company LLC, Hopkinton, MA (US)

(72) Inventors: Kfir Wolfson, Beer Sheva (IL); Udi Shemer, Kfar Saba (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 316 days.

(21) Appl. No.: 16/248,690

(22) Filed: Jan. 15, 2019

(65) Prior Publication Data

US 2020/0226115 A1    Jul. 16, 2020

(51) Int. Cl.
*G06F 16/22*    (2019.01)
*G06F 11/14*    (2006.01)

(52) U.S. Cl.
CPC ...... *G06F 16/2255* (2019.01); *G06F 11/1453* (2013.01); *G06F 11/1469* (2013.01); *G06F 16/2246* (2019.01); *G06F 2201/84* (2013.01)

(58) Field of Classification Search
CPC ............. G06F 16/2255; G06F 16/2246; G06F 11/1453; G06F 11/1469; G06F 2201/84
USPC ........................................................ 707/649
See application file for complete search history.

(56) References Cited

U.S. PATENT DOCUMENTS

| | | | |
|---|---|---|---|
| 7,788,240 B2* | 8/2010 | Rossmann | G06F 16/9014 707/698 |
| 9,443,108 B1* | 9/2016 | Roth | H04L 9/3239 |
| 9,971,526 B1* | 5/2018 | Wei | G06F 3/0619 |
| 10,353,884 B2* | 7/2019 | Sharma | G06F 16/137 |
| 2010/0332471 A1* | 12/2010 | Cypher | G06F 16/2255 707/736 |
| 2013/0097380 A1* | 4/2013 | Colgrove | G06F 3/0641 711/118 |
| 2018/0143780 A1* | 5/2018 | Cho | G06F 3/0688 |
| 2019/0087115 A1* | 3/2019 | Li | G06F 16/137 |

* cited by examiner

*Primary Examiner* — Hares Jami
(74) *Attorney, Agent, or Firm* — Staniford Tomita LLP (57) ABSTRACT

Embodiments for providing memory for continuous data protection in a data storage system by storing a first key-value map as a data structure wherein the key is an address of a volume and the value comprises timestamp and hash value pairs for each time the address had data written thereto, and corresponding hash values of the written data, and storing a second key-value map as a data structure wherein the key comprises the hash value and the value comprises the written data. The first key-value map and second key-value map are implemented as a driver component in a server computer of the data storage system. The driver exposes a block device protocol on the server computer and leverages the key-value data structures for use with a deduplication storage system.

18 Claims, 8 Drawing Sheets

301              303
key            values

302 MAP 1

304 MAP 2

FAST KEY-VALUE STORAGE FOR CONTINUOUS DATA PROTECTION SYSTEMS

TECHNICAL FIELD

Embodiments are generally directed to large-scale data storage systems and more specifically, to using ultrafast key value stores for continuous data protection.

BACKGROUND

Large-scale data storage networks rely on continuous data protection (CDP) to automatically save a copy of every change made to the data. This allows the network to capture every version of the data that the user saves, thus providing the ability to restore data to any point in time in the event of hardware failure, system outages, and other significant disruptive events. CDP runs as a service that captures changes to data to a separate storage location and can provide fine granularities of restorable data objects (e.g., files, documents, directories, etc.). In general, CDP, also referred to as Any Point in Time (APIT) storage allows access to the data at any point in time in the past.

One drawback of APIT storage is that it is relatively complex and there are generally not many APIT primary storage systems. Techniques such as using key-value stores can make APIT primary storage implementations significantly simpler. A key-value store is a data storage paradigm designed for storing, retrieving, and managing associative arrays (e.g., a dictionary or hash table). Dictionaries contain a collection of records that have different fields, each containing data. These records are stored and retrieved using a unique key that identifies the record, and is used to quickly find the data within the store or database. Unlike relational database (RDBs) that pre-define the data structure as series of tables, key-value stores treat the data as a single collection, which may have different ds for every record. Key-value stores also use much less memory than RDBs to store the same database.

Key-value stores are used in significant amount of applications. Present implementations typically create key-value stores over block storage devices. In a block storage device, data is organized as blocks to emulate traditional disk or tape storage. Blocks a identified by an arbitrary and assigned identifier by which they may be stored and retrieved. Since an identifier has no direct meaning in terms of files or documents, a filesystems (FS) is applied on top of the block-level storage to map files onto a sequence of blocks. Key-value stores can be easily scaled out, such as by dividing ("sharding") the keys using an easy-to-implement heuristic, such as the key's prefix; however, block storage devices are usually much more complex for scale-out.

What is needed, therefore, is a data storage method that exposes key-value stores as a primary storage with the same performance as block devices, such as for use with CDP systems to provide any point in time access to the data for deduplication backup and restore processes.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, and Data Domain Restorer are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
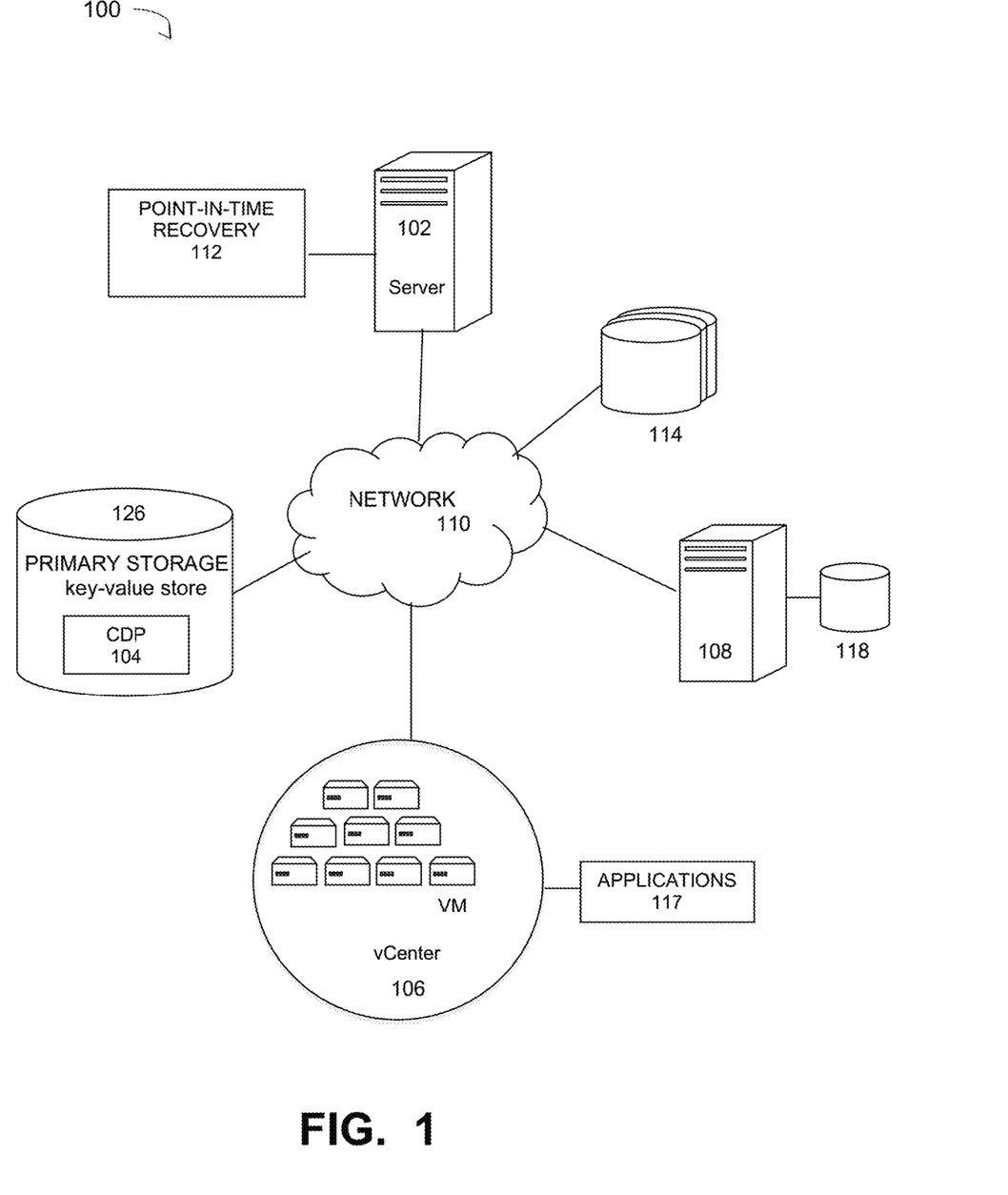
FIG. 1 is a diagram of a large-scale network implementing a continuous data protection process using ultrafast key-value storage, under some embodiments.

FIG. 1 is a diagram of a large-scale network implementing a continuous data protection process using ultrafast key-value storage, under some embodiments. As shown in FIG. 1, a network server computer 102 is coupled directly or indirectly to primary and secondary storage devices, such RAID storage 114 or virtual machines (VMs) 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

In system 100, virtual machines may be organized into one or more vCenters (virtual centers) 106 representing a physical or virtual network of many virtual machines (VMs), such as on the order of thousands of VMs each. Such VMs may be primary VMs which run applications 117 and may utilize one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

The data generated or sourced by system 100 may be stored in any number of persistent storage locations and devices, such as local client storage, server storage (e.g., 118), or network storage (e.g., 114), which may at least be partially implemented through storage device arrays, such as RAID (redundant array of independent disks) components. In an embodiment network 100 may be implemented to provide support for various storage architectures such as storage area network (SAN), network-attached storage (NAS), or direct-attached storage (DAS) that make use of large-scale network accessible storage devices 114, such as large capacity disk (optical or magnetic) arrays.

For the embodiment of FIG. 1, network system 100 represents a data processing and data storage system that includes storage device 126 that serves as primary storage for the system. There may also be a management server 102 that executes a process that can restore the system to any previous point in time through an any point-in-time (APIT) recovery or restore process 112. The PITR process 112 allows an administrator to restore or recover a set of data or a system setting from a particular point (time) in the past.

In an embodiment, system 100 utilizes snapshot backups as recovery points to create point-in-time copies of a replica of the data to be stored by the primary storage media 126. The replica thus comprises a complete point-in-time copy of the data stored in the storage media of the systems and which may be organized as files, folders, directories, volumes, etc. for data sources or one more protected computers. A data protection process may be used to copy a full replica of selected data to an allocated replica volume on a storage server. The recovery points of each replica in a protection group are created according to a specified schedule or point-in-time mechanism to allow a user to access the recovery points to recover previous versions of files in the event of data loss or corruption.

In an embodiment, system 100 may represent part of a Data Domain Restorer (DDR)-based deduplication storage system, and server 102 may be implemented as a DDR Deduplication Storage server provided by EMC Corporation. However, other similar data storage systems are also possible. A deduplication storage system generally represents a single-instance storage system in which redundant copies of data are eliminated to reduce storage overhead. Redundant data blocks are replaced with a pointer to the unique data copy so that only one unique instance of data is stored on the storage media (e.g., flash memory, disk, tape, etc.).

For the embodiment of FIG. 1, storage array 126 executes a continuous data protection process 114 that provides CDP capability for system 100. In accordance with standard CDP methods, CDP process 104 automatically saves a copy of every change made to data being backed up, thus capturing every version of the data that the user saves. It can be configured to save the data for various levels of granularity, such as byte-level or block-level differences, rather than file-level differences. In present systems, CDP solutions reside either external to the storage (e.g., the EMC RecoverPoint system) or inside the storage processors (e.g., SRDF). Such solutions require large movements of data out of the physical drives and quite a lot of CPU usage in order to keep a journal or log of the write I/Os and allow any point in time access to the protected data.

Embodiments are directed to a storage array, such as primary storage 126 that supports CDP by providing any point in time access by exposing block device protocols on the host side and leveraging key-value stores on the back-end. This creates a storage system that also supports any point in time access to the data, along with de-duplication, by leveraging the underlying key value store.

Figure 2:
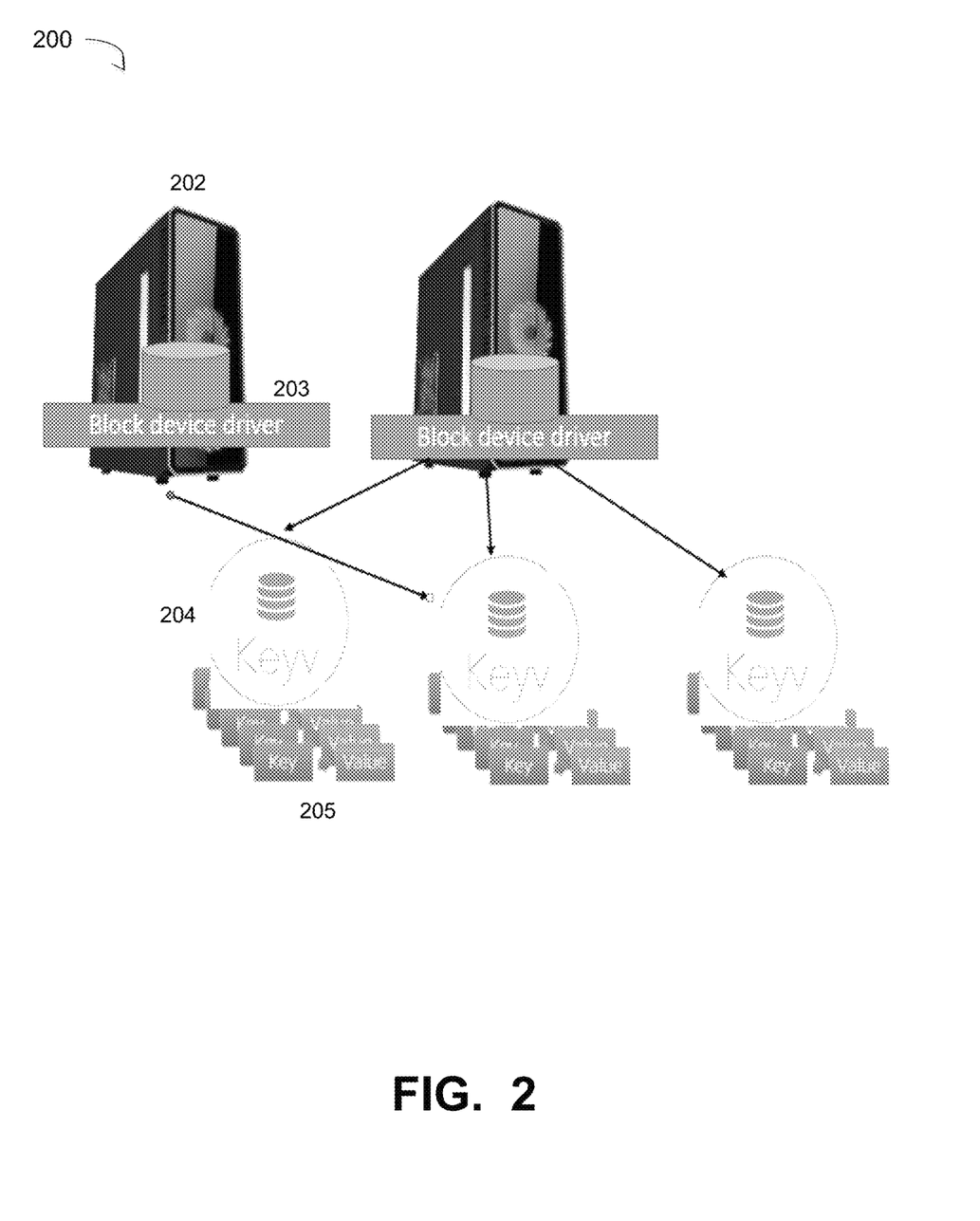
FIG. 2 illustrates a block device driver accessing a key-value store, under some embodiments.

FIG. 2 illustrates a block device driver accessing a key-value store, under some embodiments. As shown in system 200 of FIG. 2, block device drivers 202 implemented in respective host computers 202 each access key-stores 204. The key-value stores 204 store key-value pairs 205 using known key-value store conventions. The system of FIG. 2 thus illustrates server computers running block device drivers that leverage key-value storage to expose block devices. Block storage arrays generally support a limited number of volumes, but by leveraging a key value store, the system 200 can support a virtually unlimited number of volumes limited only by the range of the volume ID. The system also utilizes data deduplication for storage efficiency. The key-value storage is inherently deduplicated, thus significantly improving storage capacity and efficiency. The system creates a deduplicated block storage based on a fast key-value store. In an embodiment, the key-value storage is implemented as a driver in the host server, and the driver is stateless, i.e., all the persistent data is stored in the key-value storage, except for certain cached data elements, which can be used to improve performance.

Figure 3:
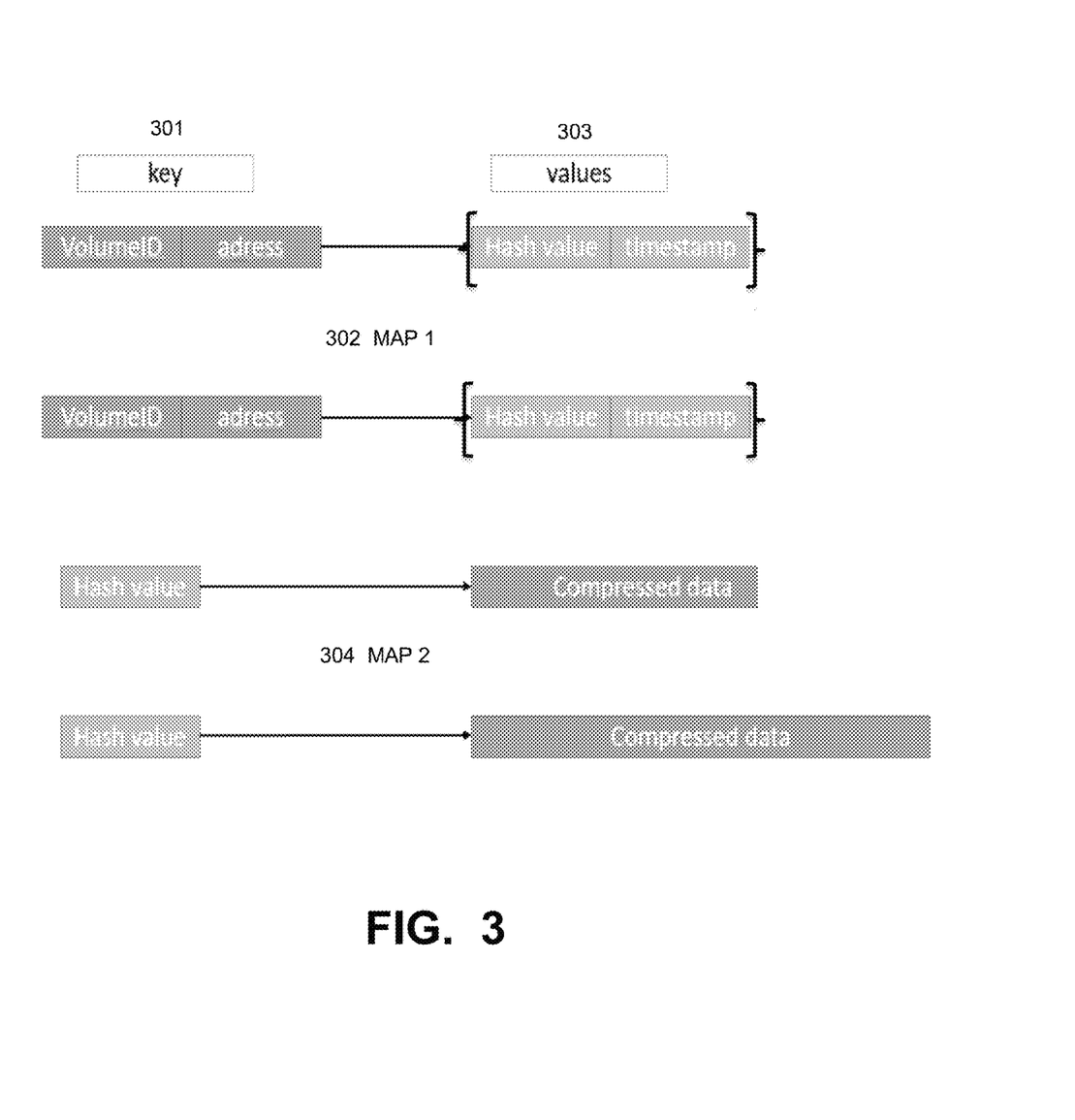
FIG. 3 is a schematic diagram for the history and data maps, under some embodiments.

In an embodiment, certain data structures are defined to create an APIT-based storage using key-value storage. A first data structure is a history map (map 1), which is a table where the key is the address in the volume. To support multiple volumes, the address will include the volume ID. In an embodiment, the history map can be expressed as:

(Volume-Id, Address)→Sorted list of (Timestamp, Hash value) pairs

The address space can be divided into fixed blocks, for example 8 KB blocks, or any other similar or appropriate size. The value attached to the key will be a list of all the times the address was written to, and the hash values of the data at each time. A garbage collection process (described in greater detail below) might be used to remove some history from the data structures, so this table will include only the list entries for which the data is still in storage.

A second data structure is a data map (map 2), is a mapping between the hash value and the compressed data. This saves the data itself in the key-value store, and essentially implements the deduplication part of the process. In an embodiment, the history map can be expressed as:

Hash Value→Data

FIG. 3 is a schematic diagram for the history and data maps, under some embodiments. As shown in diagram 300, key 301 and values 303 are provided for the history map (map 1) 302 and the data map (map 2) 304. For map 1, the key (VolumeID/Address) maps to the values of hash value/timestamp. For map 2, the key (hash value) maps to the value of compressed data. The mapping schematic of FIG. 3 is representative of one mapping scheme, and other key-value mapping schemes are also possible.

Figure 4:
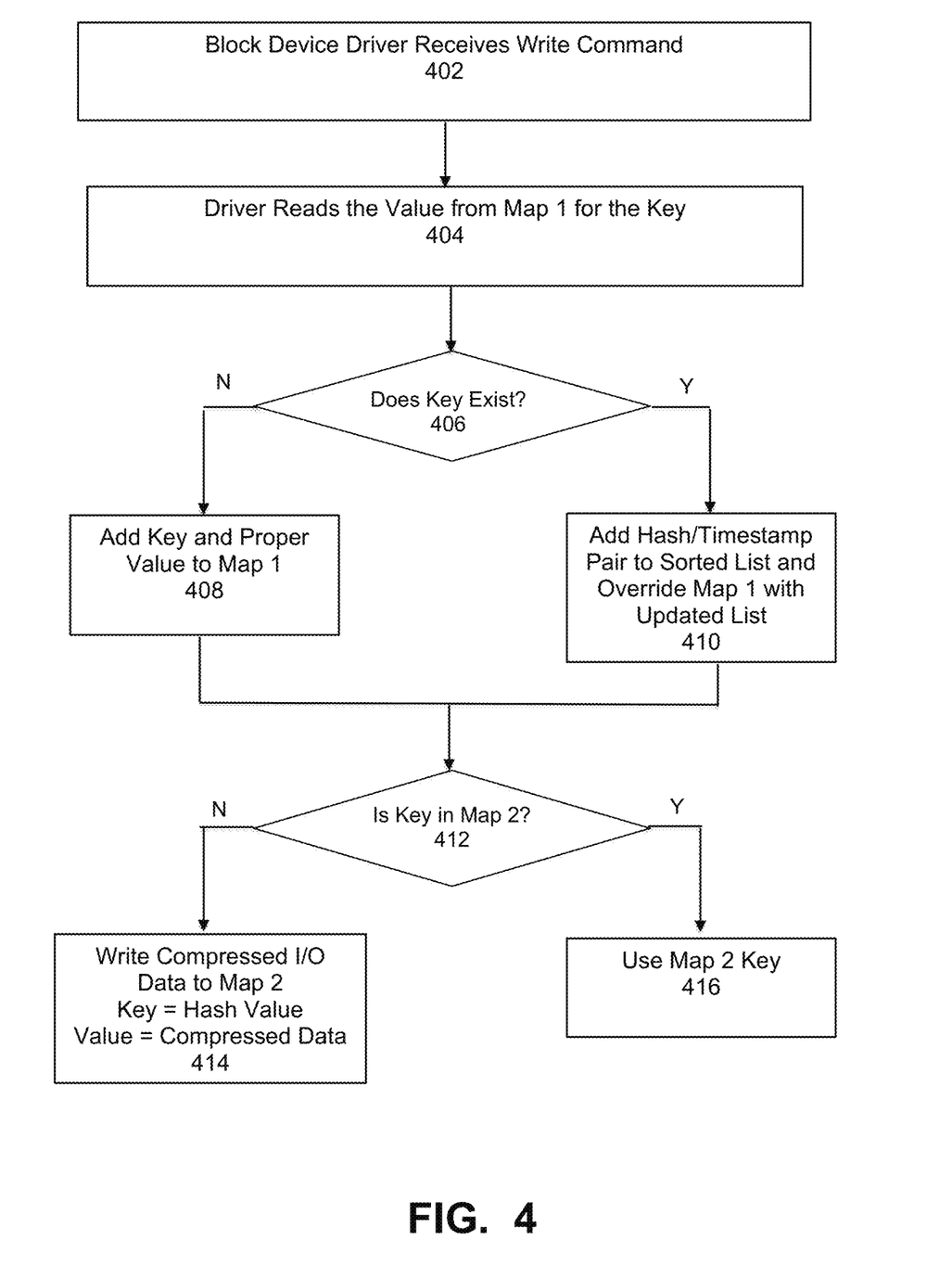
FIG. 4 is a flowchart that illustrates a method of implementing APIT storage using fast key-value stores for a write command, under some embodiments.

FIG. 4 is a flowchart that illustrates a method of implementing APIT storage using fast key-value stores for a write command, under some embodiments. As shown in FIG. 4, the process starts by the block device driver receiving a write command (e.g., 8 KB aligned write), 402. The driver reads the value for the from Map 1 (history map) for the key= (volumeID, address). If the key does not exist, as determined in step 406, the system will add the key and the proper value to Map 1, 408. The list will then have a single entry containing the data hash and the current timestamp of the I/O. If the key already exists, the system will add the (hash, timestamp) pair to the head of the sorted list (which was previously stored as the value in Map 1 for that key), and override the Map 1 entry with the updated list, 410. In parallel, the driver will check if key=(hash of the IO data) is already in Map 2, step 412. If hash value key does not exist, the Write I/O data will be compressed, and written to Map 2 with the hash value as the key, and the compressed data as the value, 414. If the has value key does exist, there is no need to write the data again, since it already has the hash pointing to it.

With respect to the write process of FIG. 4, certain implementation procedures can be used, depending on system configuration and requirements. For example, larger write commands can be separated to 8 KB writes, and smaller write commands will implement read/modify/write. The list can be doubly-linked list so that it can be traversed in either direction and will be kept sorted, and ordered by timestamp (descending order). The system can hold pointers to the head and tail of the list for immediate access to each end (i.e., newest I/O and oldest I/O of each data block). It is relatively simple to keep the list sorted since the process only adds/removes entries from its head or tail.

Figure 5A:
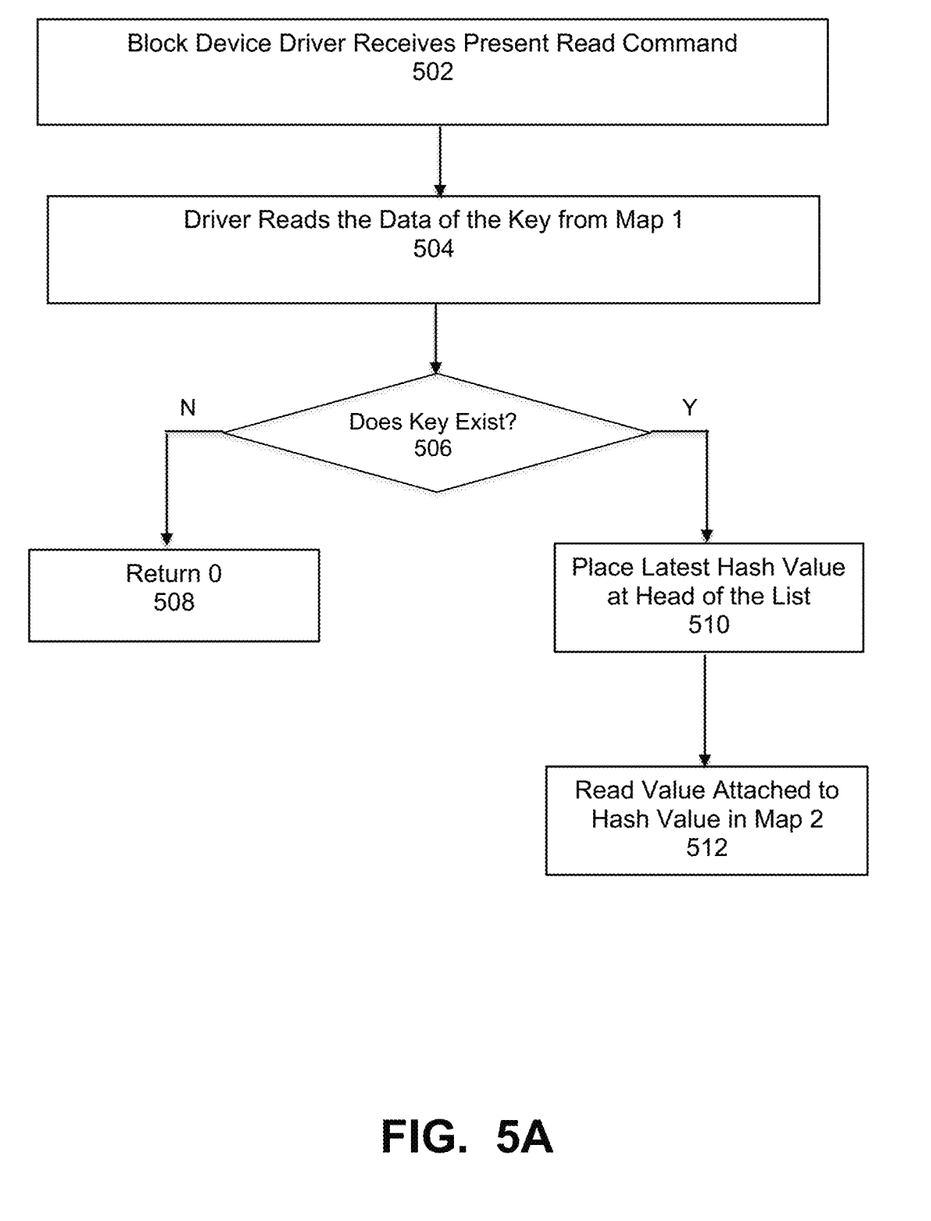
FIG. 5A is a flowchart that illustrates a method of implementing APIT storage using fast key-value stores for a present read command, under some embodiments.

FIG. 5A is a flowchart that illustrates a method of implementing APIT storage using fast key-value stores for a present read command, under some embodiments. As shown in FIG. 5A, the process starts with the driver receiving a present read command (e.g., 8 KB aligned read), 502. The driver reads the data of the Key=(volumeID, address) from Map 1, 504. If, in step 506 it is determined that the value does not exist, the process returns a zero, which is the standard return value for offsets which were never written to in a storage disk, 508. If the value exists, the latest hash value will be placed at the head of the list, 510. The process then reads the value attached to the hash value in Map 2, 512.

Figure 5B:
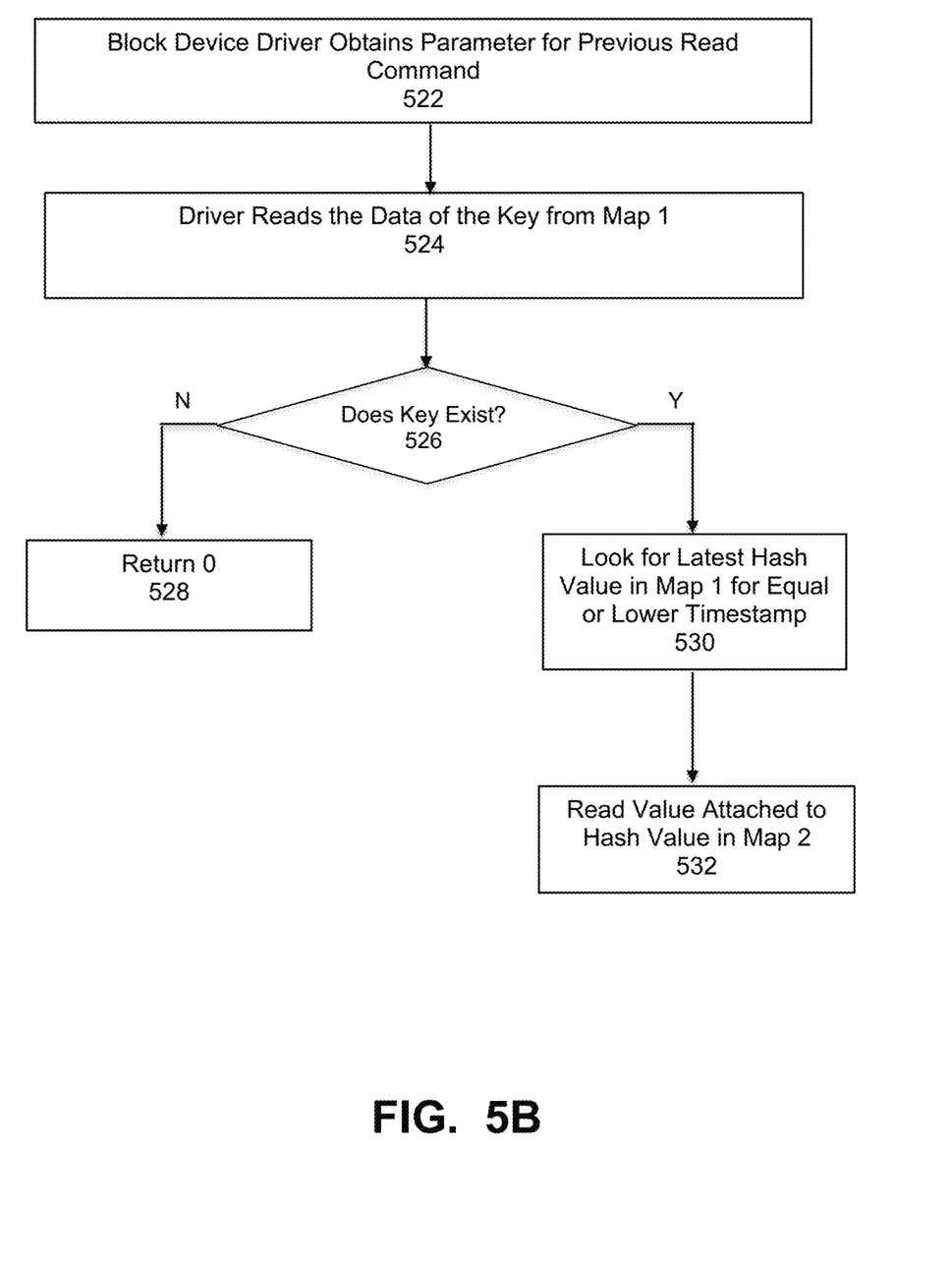
FIG. 5B is a flowchart that illustrates a method of implementing APIT storage using fast key-value stores for a previous point in time read command, under some embodiments.

FIG. 5B is a flowchart that illustrates a method of implementing APIT storage using fast key-value stores for a previous point in time read command, under some embodiments. Such a read command will have a parameter of the requested point in time, so in step 522, the driver obtains the parameter for the previous point in time read command (e.g., 8 KB read). The driver reads the data of the Key=(volumeID, address), 524. If, in step 526 it is determined that the value does not exist, the process returns a zero, 528. If the value does not exist, the process returns a 0 value, 528. If the value does exist, the process looks for the latest hash value in the Map 1 value list where the timestamp is equal to or lower than the requested point in time, 530. The process then reads the value attached to the hash value, 532.

The embodiments of FIGS. 4, 5A and 5B are relatively simple implementations that require two key-value read operations for each Read IO, and two reads and two write key-value operations for each Write I/O. For any-point-in-time access, this requires traversing the list in Map 1 looking for the requested timestamp.

In an alternative embodiment, this implementation can be improved with certain refinements, such as caching or an improved list implementation. A first alternative embodiment therefore involves caching of Map 2 keys (i.e., to determine if a hash exists in Map 2). For this embodiment, a Bloom filter on the host can be used. A Bloom filter is a space-efficient probabilistic data structure that is used to test whether an element is a member of a set. False positive matches are possible, but false negatives are not possible. Thus, a query returns either "possibly in set" or "definitely not in set". Elements can be added to the set, but not removed, and the more elements that are added to the set, the larger the probability of false positives. The Bloom filter will generally reduce the lookup time compared to regular map lookups. For the caching implementation, other similar mechanisms to a Bloom filter may also be used, and embodiments are not so limited.

Embodiments above described the use of a doubly-linked-list. In an improved list implementation, the whole list is not saved as the value in Map 1. For this embodiment, only a list of metadata, containing a pointer to the head and tail of the list nodes will be saved as the value of Map 1, and the actual nodes of the list will be saved in separate keys in the map. The key can be, for example, a random number and the value will contain a pointer to the next and previous nodes in the list. The pointers are the keys (numbers) of the node's neighbors. It will also contain a pointer to the list metadata (which is the original key: <volumeID, offset>).

For this improved list embodiment, the WRITE/READ I/O processes of FIGS. 4, 5A, and 5B are only slightly altered. For this embodiment, the processes simply use this new format of a list. The improved list provides improved performance as the Map 1 values are much smaller. There is no need to update this large value upon the WRITE I/O, the process just adds to the tail of the list. This embodiment, however, does not necessarily improve lookup time.

To improve the APIT lookup time, a further refinement is provided. In general, the values for each address can grow indefinitely, if the system writes to the same address all the time. In a further alternative embodiment, the process stores a B-Tree instead of a list as the value of Map 1. The B-Tree root will include the latest value to ensure that a read from the latest point in time will require only one read operation. Finding the point in time will be logarithmic time, and for all practical use-cases even constant, that is, if the B-Tree is wide enough (e.g., of degree 100), the depth of a tree will be very low for all practical disk sizes, and definitely much less than 10 (which means 10^20 entries to the same address). This means that even at the worst case a write to an address will take a constant amount of key-value operations, and in most cases four operations without caching (i.e., two reads and two writes). The B-Tree internal pointers can be random keys.

As is generally known, a B-Tree is a generalization of a binary search tree in that a node can have more than two children. A B-Tree of order m is a tree which satisfies the following properties: every node has at most m children, every non-leaf node (except root) has at least [m/2] child nodes, and the root has at least two children if it is not a leaf node. It is generally a self-balancing tree data structure that maintains sorted data and allows searches, sequential access, insertions, and deletions in logarithmic time.

Figure 6:
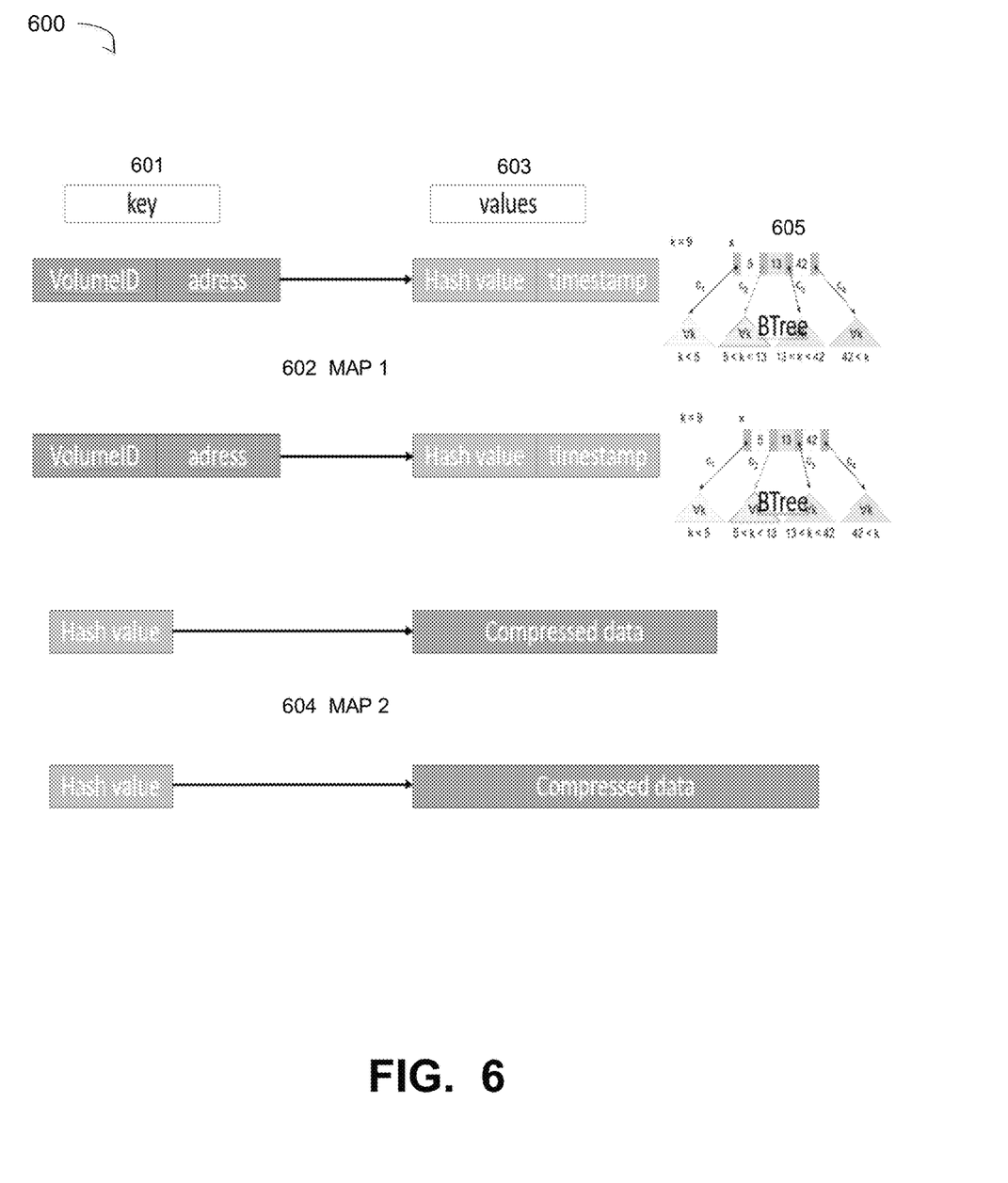
FIG. 6 is a diagram of history and data map schematic entries using B-Trees for efficient APIT access, under some embodiments.

FIG. 6 is a diagram of Map 1 and Map 2 schematic entries using B-Trees for efficient APIT access, under some embodiments. As shown in FIG. 6, the keys 601 and values 603 for Map 1 (602) and Map 2 (604) are as shown for the embodiment of FIG. 3. For this embodiment, however, the Map 1 values have associated B-Trees 605. With respect to the implementation of the B-Tree on the key value storage, each node in the tree is stored in a value pointed to by a random number. Each node is of fixed size K and will hold pointers to the level beneath it until the leaf node which contain the hashes to the data. This limits the size of the value to a fixed size. A node does not need to have all items filled and a simple list can be employed in the node value to track what is used. Typically K–2K B-Trees are used. In an example where K=50, a node will not have more than 2K=100 items. It will split nodes when item count is greater than 2K and unite nodes at item count is less than K. The root node contains the latest value for optimization.

In a further alternative embodiment, sequential I/O operation acceleration is used in the APIT process. Since many real-world applications access storage sequentially in both Reads and Writes, this optimization exploits the fact that the address key will not cover a single address but several addresses, for example 16 addresses (or 128 KB). In this case, a single read will bring to the host cache hashes of 16 addresses. Thus, if reads or write are sequential, there will be no need to do an extra read from Map 1. In this case, if the B-Tree is implemented, the root have all the latest values, and the B-Tree will be sorted by first the address and then the timestamp.

In general, the described embodiments assume that all points in time are stored. As briefly mentioned above, if the system desires to delete older points in time data, there will be a need for a garbage collection process. Embodiments thus include a garbage collection mechanism in conjunction with the key-value store. A trivial implementation would be to read metadata of all addresses (Map 1), remove the old time stamps (from the tail of the list). This method will also need to understand the reference count of each hash (in Map 2), and delete hashes without any pointers. Certain known optimizations of garbage collection may be used in relation to this embodiment.

With respect to scale-out, it is important to note that it is generally quite easy to create a scale-out architecture as there is just a need to divide ("shard") the key spaces and send each key space to a different key/value storage or host. The Map 1 key space is easily divided in this manner. For Map 2, the scale-out process is a bit more involved. Assume that a key prefix is used to divide, though any other mechanism will work as well. For this embodiment, the process uses the Map 2 prefix to tell where the data is stored. This means that for two shards, each shard will store half the data, and there will be 1/N for N shards. Caching of Map 2 keys is desired in order to reduce lookup time as it is cross machine access. Keys can be cached, or semi cached using Bloom filters, as described above. The actual data is returned directly from the machine that manages it. The process only needs the key lookup to handle non-existing keys and check if hashes exist.

Embodiments thus described create a scaled-out architecture which that supports a limitless number of volumes, supports de-duplication and compression, and supports reading data from any point in time, with minimal access to a key-value store for any I/O operation.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 7:
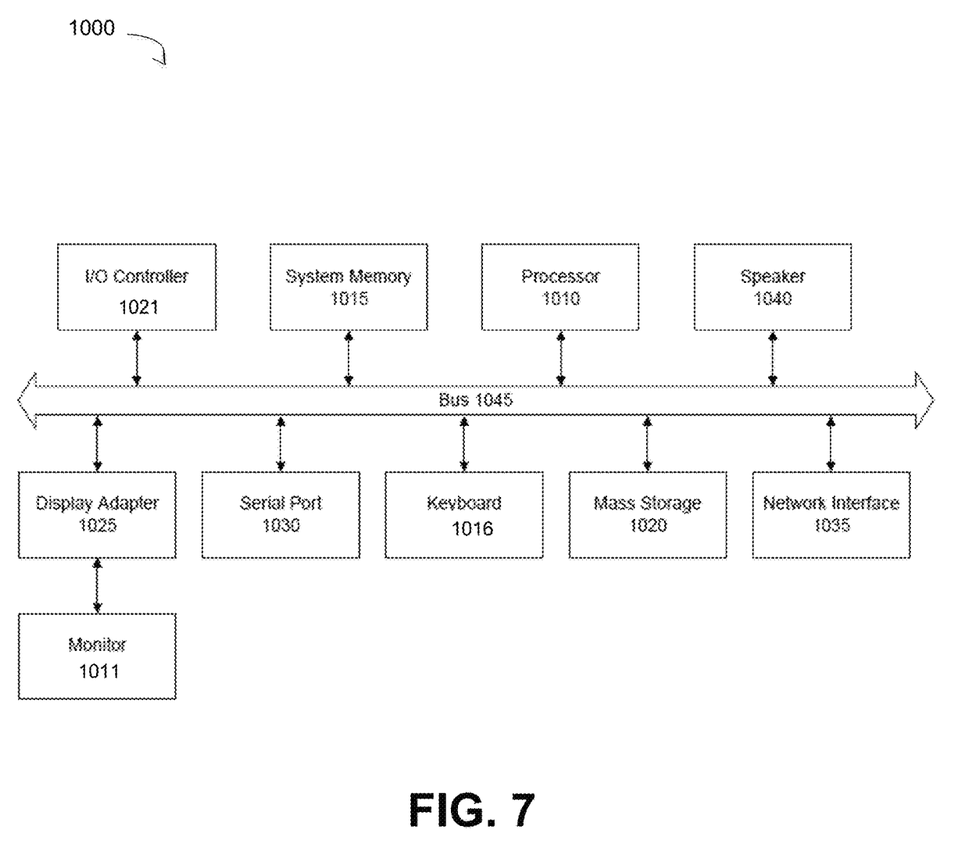
FIG. 7 is a block diagram of a computer system used to execute one or more software components of a system for continuous data protection using ultrafast key-value stores, under some embodiments.

FIG. 7 is a block diagram of a computer system used to execute one or more software components of a system for providing key-value storage for continuous data protection systems, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 4 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   implementing a history map as a first key-value map mapping addresses to hash value-timestamp pairs of data written to the addresses;
   implementing a data map as a second key-value map mapping the hash values of the data to compressed versions of the data;
   receiving, in a block device driver of a server computer, a write command, the driver exposing a block device protocol on the server computer;
   upon receipt of a write command, reading by the driver a value for the key and adding the key and appropriate value to the history map if the key does not exist, otherwise adding the hash value-timestamp pair to a head of a sorted list previously stored as the value in the history map;

storing the history map as a data structure in which the key is an address of a volume and the value comprises timestamp and hash value pairs for each time the address had written data written thereto and corresponding hash values of the written data;

storing the data map as a data structure wherein the key comprises the hash value and the value comprises the written data; and checking if the key comprising a hash of the written data is present in the data map, and if not, compressing the written data as the value in the data map.

2. The method of claim 1 further comprising:
receiving a read command;
reading, in response to the read command, data of the key from the history map;
returning, if the value does not exist, a zero offset value; and
reading, if the value does exist, the value attached to the hash value in the data map.

3. The method of claim 1 further comprising:
receiving a previous point-in-time read command;
reading, in response to the previous point-in-time read command, data of the key from the history map;
returning, if the value does not exist, a zero offset value;
finding, if the value does exist, a latest hash value in the history map value list for a timestamp equal to or lower than the point in time of the previous point-in-time read command; and
reading the value attached to the hash value in the data map.

4. The method of claim 1 wherein the first map and second map are implemented as a stateless driver component in the server computer operating in a data storage system.

5. The method of claim 4 further comprising caching the keys of the data map in cache memory of the server computer.

6. The method of claim 5 wherein the caching is implemented through the use of a Bloom filter.

7. The method of claim 1 wherein the sorted list comprises a double-linked list for traversal in either direction and is sorted by timestamp value in descending order.

8. The method of claim 7 further comprising saving list metadata containing a pointer to a head and tail of the double-linked list instead of the entire double-linked list as the value in the history map.

9. The method of claim 1 further comprising storing a B-Tree as the value of the history map instead of the sorted list.

10. The method of claim 9 wherein a root of the B-Tree includes a latest value of data so that a read from a latest point in time only requires one read operation, and wherein each node in the B-Tree is stored in a value pointed to by a random number, and is of a fixed size and holds pointers to a lower level until a leaf node that contains hashes to the data is reached.

11. The method of claim 1 further comprising performing a garbage collection process on the history map to remove some history from the history map so as to include only a list of entries for which data is still in storage.

12. The method of claim 1 wherein the address key in the history map covers a plurality of addresses for acceleration of sequential read/write operations.

13. The method of claim 4 wherein the history map key space and data map key space are each divided and each key space is sent to a different server computer.

14. A computer-implemented method of providing memory for continuous data protection in a data storage system, comprising:
receiving, in a block device driver implemented in a server computer of the data storage system, a write command, the driver exposing a block device protocol on the server computer;
reading, by the driver, a value in a key-value store from a history map and adding a key and appropriate value to the history map if the key does not exist, otherwise adding a value-timestamp pair to a head of a sorted list previously stored as the value in the history map;
storing the history map as a data structure in which the key is an address of a volume and the value comprises timestamp and hash value pairs for each time the address had written data written thereto and corresponding hash values of the written data;
checking if the key comprising a hash of the written data is present in a data map, and if not, compressing the written data as the value in the data map; and
storing the data map as a data structure wherein the key comprises the hash value and the value comprises the written data.

15. The method of claim 14 further comprising:
receiving one of a read command or a previous point-in-time read command;
if a read command, reading, in response to the read command, data of the key from the history map;
returning, if the value does not exist, a zero offset value; and
reading, if the value does exist, the value attached to the hash value in the data map;
if a previous point-in-time read command, reading, in response to the previous point-in-time read command, data of the key from the history map;
returning, if the value does not exist, a zero offset value; and
finding, if the value does exist, a latest hash value in the history map value list for a timestamp equal to or lower than the point in time of the previous point-in-time read command; and
reading the value attached to the hash value in the data map.

16. The method of claim 14 wherein the address of the history map comprises a volume identifier (volumeID) to facilitate the support of multiple volumes, and wherein the written data stored in the data map comprises compressed data.

17. The method of claim 14 wherein the driver is stateless so that all persistent data is stored in the data map, and wherein the data storage system comprises a deduplication storage system.

18. The method of claim 14 further comprising performing a garbage collection process on the history map to remove some history from the history map so as to include only a list of entries for which data is still in the memory.

* * * * *